(12) United States Patent
Cao

(10) Patent No.: US 10,141,839 B2
(45) Date of Patent: Nov. 27, 2018

(54) VOLTAGE CONTROLLING CIRCUIT OF T-CON LOAD VARIATION, DISPLAY PANEL AND DISPLAY DEVICE

(71) Applicant: Shenzhen China Star Optoelectronics Technology Co., Ltd., Shenzhen, Guangdong (CN)

(72) Inventor: Dan Cao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 374 days.

(21) Appl. No.: 14/906,551

(22) PCT Filed: Dec. 28, 2015

(86) PCT No.: PCT/CN2015/099214
§ 371 (c)(1),
(2) Date: Jan. 20, 2016

(87) PCT Pub. No.: WO2017/092114
PCT Pub. Date: Jun. 8, 2017

(65) Prior Publication Data
US 2017/0288536 A1    Oct. 5, 2017

(30) Foreign Application Priority Data
Nov. 30, 2015   (CN) .......................... 2015 1 0852619

(51) Int. Cl.
*H02M 3/156*   (2006.01)
*G09G 3/36*    (2006.01)
*G09G 3/20*    (2006.01)

(52) U.S. Cl.
CPC .......... *H02M 3/156* (2013.01); *G09G 3/2096* (2013.01); *G09G 3/36* (2013.01);
(Continued)

(58) Field of Classification Search
CPC ..... H02M 3/156; G09G 3/36; G09G 2330/02; G09G 2310/08; G09G 3/2096; G09G 2330/00; G09G 2330/04
See application file for complete search history.

(56) References Cited

U.S. PATENT DOCUMENTS 9,183,808 B2   11/2015   Tsuchi
2005/0078063 A1*   4/2005   Chi ........................ G09G 3/294
345/63

(Continued)

FOREIGN PATENT DOCUMENTS

CN   102213971 A    10/2011
CN   103400553 A  * 11/2013
(Continued)

*Primary Examiner* — Srilakshmi K Kumar
*Assistant Examiner* — Brent D Castiaux
(74) *Attorney, Agent, or Firm* — Andrew C. Cheng

(57) ABSTRACT

The present disclosure provides a voltage controlling circuit of a T-CON load variation, a display panel and a display device. The voltage controlling circuit of the T-CON load variation includes: a power source chip and a voltage controlling circuit, and the voltage controlling circuit includes a photoelectric coupler, a first comparator, a second comparator, a first field effect transistor and a second field effect transistor. Therefore, the technical scheme of the present disclosure has an advantage that the Vcore may automatically vary with a variation of the load.

9 Claims, 3 Drawing Sheets

(52) U.S. Cl.
CPC ..... *G09G 2310/08* (2013.01); *G09G 2330/00* (2013.01); *G09G 2330/02* (2013.01); *G09G 2330/04* (2013.01)

(56) References Cited

U.S. PATENT DOCUMENTS

| | | | | |
|---|---|---|---|---|
| 2005/0190475 A1* | 9/2005 | Poss | ........................ | G05F 1/575 360/46 |
| 2015/0028756 A1* | 1/2015 | Cao | ...................... | G09G 3/3406 315/193 |
| 2015/0049077 A1 | 2/2015 | Tsuchi | | |
| 2015/0123552 A1* | 5/2015 | Cao | ........................ | G09G 3/342 315/193 |
| 2015/0195881 A1* | 7/2015 | Dan | ...................... | H05B 37/02 315/192 |

FOREIGN PATENT DOCUMENTS

| | | | |
|---|---|---|---|
| CN | 103400553 A | | 11/2013 |
| CN | 103531156 A | * | 1/2014 |
| CN | 103531156 A | | 1/2014 |
| CN | 103595018 A | * | 2/2014 |
| CN | 103595018 A | | 2/2014 |
| CN | 104009638 A | | 8/2014 |

* cited by examiner

VOLTAGE CONTROLLING CIRCUIT OF T-CON LOAD VARIATION, DISPLAY PANEL AND DISPLAY DEVICE

CROSS-REFERENCE TO RELATED APPLICATIONS

This application claims the benefit of, and priority to, Chinese Patent Application No. 201510852619.X, filed Nov. 30, 2015, titled "voltage controlling circuit of t-con load variation, display panel and display device", the entire contents of which are incorporated by reference herein in its entirety.

FIELD OF THE INVENTION

The disclosure is related to display technology field, and more particular to a voltage controlling circuit of a T-CON load variation, a display panel and a display device.

BACKGROUND OF THE INVENTION

The liquid crystal panel, also known as the liquid crystal display (LCD), is an electronic display device which is commonly used currently, and a timing controller (T-CON) is a circuit commonly used in a direct current (DC-DC) circuit of the display device. The existing T-CON circuit is shown in FIG. 1.

In the implementation of the technical scheme in the existing technique, the following technical problems exist.

The core power voltage of the existing T-CON requires to be very stable, and it can not vary with a load. When the load varies, the output voltage Vcore of the core power voltage of the existing T-CON may vary with the variation of the load. Thus theT-CON may work incorrectly.

SUMMARY OF THE INVENTION

A voltage controlling circuit of a T-CON load variation is provided. A control circuit is added in the voltage controlling circuit of the T-CON load variation. The control circuit is capable of automatically controlling a voltage with the load variation, so as to increase stability of T-CON core power voltage and ensure that T-CON may normally work under the different loads.

A first aspect provides a voltage controlling circuit of a T-CON load variation, the voltage controlling circuit of the T-CON load variation includes: a power source chip and a voltage controlling circuit, and the voltage controlling circuit includes a photoelectric coupler, a first comparator, a second comparator, a first field effect transistor and a second field effect transistor;

wherein a first pin of the photoelectric coupler is coupled to the other terminal of an inductor, one terminal of the inductor is connected to a voltage output terminal of the power source chip, a second pin of the photoelectric coupler is connected to a core voltage, a third pin of the photoelectric coupler is connected to the other terminal of a first resistor, one terminal of the first resistor is connected to a ground, and a fourth pin of the photoelectric coupler is connected to a first voltage source;

wherein a positive power terminal of the first comparator is connected to a second voltage source, a negative power terminal of the first comparator is connected to an equivalent electric potential point, a positive input terminal of the first comparator is connected to the third pin of the photoelectric coupler, a negative input terminal of the first comparator is connected to a first comparing voltage, and an output terminal of the first comparator is connected to a gate of the second field effect transistor; a positive power terminal of the second comparator is connected to the second voltage source, a negative power terminal of the second comparator is connected to an equivalent electric potential point, a negative input terminal of the second comparator is connected to the third pin of the photoelectric coupler, a positive input terminal of the second comparator is connected to a second comparing voltage, and an output terminal of the second comparator is connected to a gate of the first field effect transistor;

wherein a drain of the first field effect transistor is connected to the core voltage, a source of the first field effect transistor is connected to one terminal of a second resistor, the other terminal of the second resistor is connected to a feedback voltage terminal of the power source chip, a drain of the second field effect transistor is connected to the other terminal of a third resistor, one terminal of the third resistor is connected to the feedback voltage terminal of the power source chip, and a source of the second field effect transistor is connected to the ground.

Combined with the voltage controlling circuit of the T-CON load variation provided by the first aspect, in a first optional scheme of the first aspect, the voltage controlling circuit further includes: a fourth resistor (R138);

wherein one terminal of the fourth resistor is connected to the fourth pin of the photoelectric coupler and the other terminal of the fourth resistor is connected to the first voltage source.

Combined with the voltage controlling circuit of the T-CON load variation provided by the first aspect, in a second optional scheme of the first aspect, the voltage controlling circuit further includes: a capacitor;

wherein one terminal of the capacitor is connected to the other terminal of the inductor, the other terminal of the capacitor is respectively connected to the output terminal of the first comparator and the output terminal of the second comparator.

Combined with the voltage controlling circuit of the T-CON load variation provided by the first aspect, in a third optional scheme of the first aspect, the second voltage source is a voltage source with 3.3V or a voltage source with 5.5V.

A second aspect provides a display panel, the display panel includes: a voltage controlling circuit of a T-CON load variation and the voltage controlling circuit of the T-CON load variation includes: a power source chip and a voltage controlling circuit, and the voltage controlling circuit comprises a photoelectric coupler, a first comparator, a second comparator, a first field effect transistor and a second field effect transistor;

wherein a first pin of the photoelectric coupler is coupled to the other terminal of an inductor, one terminal of the inductor is connected to a voltage output terminal of the power source chip, a second pin of the photoelectric coupler is connected to a core voltage, a third pin of the photoelectric coupler is connected to the other terminal of a first resistor, one terminal of the first resistor is connected to a ground, and a fourth pin of the photoelectric coupler is connected to a first voltage source;

wherein a positive power terminal of the first comparator is connected to a second voltage source, a negative power terminal of the first comparator is connected to an equivalent electric potential point, a positive input terminal of the first comparator is connected to the third pin of the photoelectric coupler, a negative input terminal of the first comparator is connected to a first comparing voltage, and an output terminal of the first comparator is connected to a gate of the second field effect transistor; a positive power terminal of the second comparator is connected to the second voltage source, a negative power terminal of the second comparator is connected to an equivalent electric potential point, a negative input terminal of the second comparator is connected to the third pin of the photoelectric coupler, a positive input terminal of the second comparator is connected to a second comparing voltage, and an output terminal of the second comparator is connected to a gate of the first field effect transistor;

wherein a drain of the first field effect transistor is connected to the core voltage, a source of the first field effect transistor is connected to one terminal of a second resistor, the other terminal of the second resistor is connected to a feedback voltage terminal of the power source chip, a drain of the second field effect transistor is connected to the other terminal of a third resistor, one terminal of the third resistor is connected to the feedback voltage terminal of the power source chip, and a source of the second field effect transistor is connected to the ground.

Combined with the display panel provided by the second aspect, in a first optional scheme of the second aspect, the voltage controlling circuit further includes: a fourth resistor;

wherein one terminal of the fourth resistor is connected to the fourth pin of the photoelectric coupler and the other terminal of the fourth resistor is connected to the first voltage source.

Combined with the display panel provided by the second aspect, in a second optional scheme of the second aspect, the voltage controlling circuit further includes: a capacitor;

wherein one terminal of the capacitor is connected to the other terminal of the inductor, the other terminal of the capacitor is respectively connected to the output terminal of the first comparator and the output terminal of the second comparator.

Combined with the display panel provided by the second aspect, in a third optional scheme of the second aspect, the second voltage source is a voltage source with 3.3V or a voltage source with 5.5V.

A third aspect provides a display device, and the display device includes the display panel provided by the second aspect, the first optional scheme of the second aspect, the second optional scheme of the second aspect or the third optional scheme of the second aspect.

According to the voltage controlling circuit of the T-CON load variation provided by each of the embodiments, the circuit includes a power source chip and a voltage controlling circuit, and the voltage controlling circuit is capable of adjusting a core voltage according to a variation of a load. Thus it has the advantage of controlling the core voltage with the load variation.

BRIEF DESCRIPTION OF THE DRAWINGS

In order to more clearly illustrate the prior art or the embodiments or aspects of the practice of the disclosure, the accompanying drawings for illustrating the prior art or the embodiments of the disclosure are briefly described as below. It is apparently that the drawings described below are merely some embodiments of the disclosure, and those skilled in the art may derive other drawings according the drawings described below without creative endeavor.

DETAILED DESCRIPTION

The following description with reference to the accompanying drawings is provided to clearly and completely explain the exemplary embodiments of the present disclosure. It is apparent that the following embodiments are merely some embodiments of the present disclosure rather than all embodiments of the present disclosure. According to the embodiments in the present disclosure, all the other embodiments attainable by those skilled in the art without creative endeavor belong to the protection scope of the present disclosure.

In the following description of the embodiments, if no additional explanation in following figures, a first resistor may be R172, a second resistor may be R620, a third resistor may be R622, a fourth resistor may be R138, a capacitor may be C413, a first field effect transistor may be G38, a second field effect transistor may be G36, a FB may be a feedback voltage pin of a power IC, a LX may be an output voltage pin of the power IC, a first voltage source may be VCC1, a second voltage source may be VCC2, an inductor may be L8, a first comparator may be OP1 and a second comparator may be .OP2.

Figure 1:
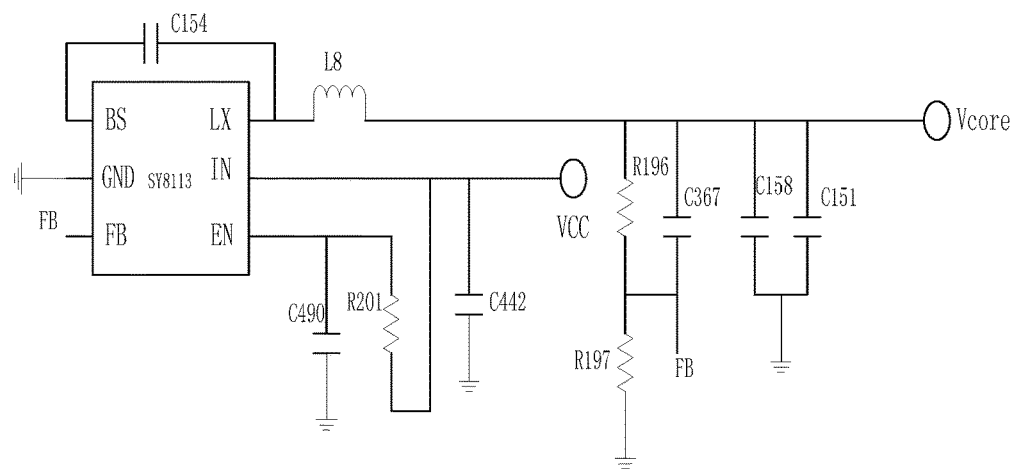
FIG. 1 is a circuit diagram of a T-CON circuit of the prior art.
Figure 2:
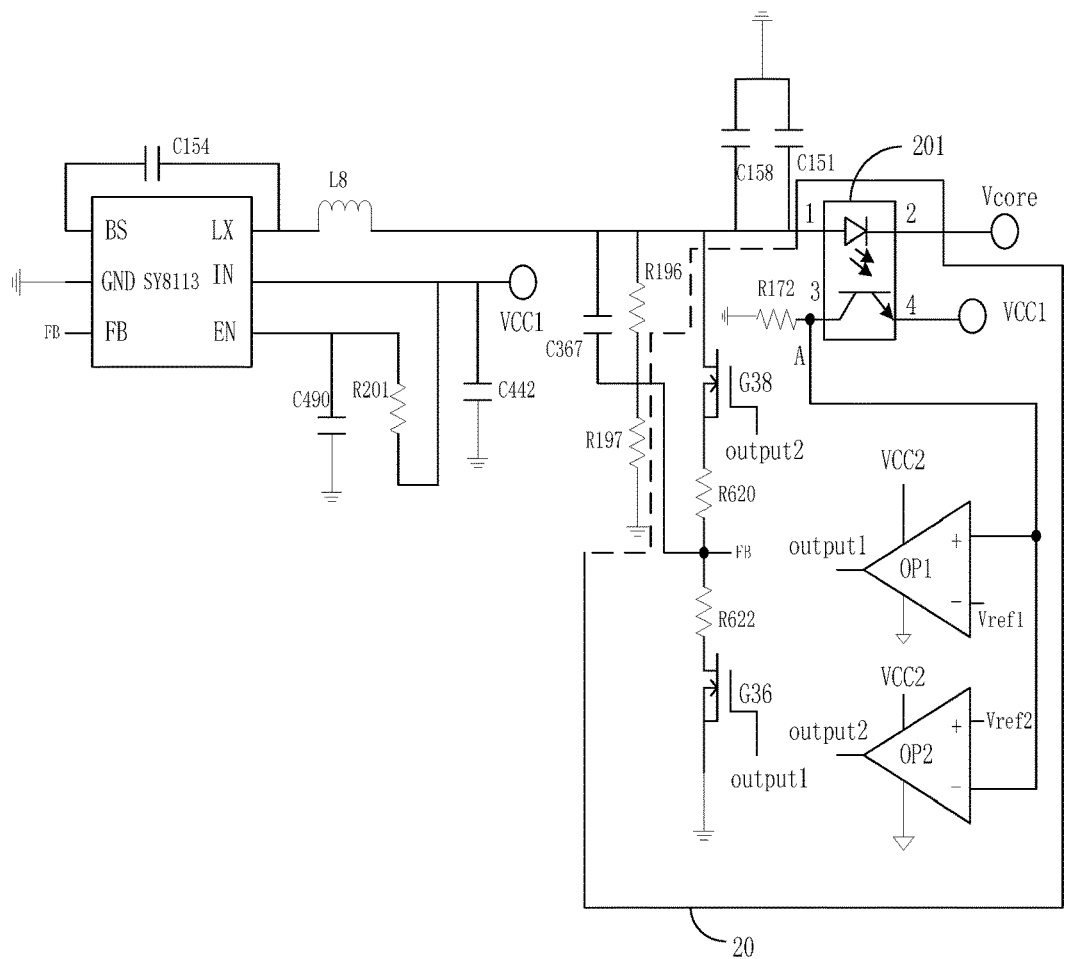
FIG. 2 is a structure schematic view of a voltage controlling circuit of a T-CON load variation according to a first embodiment of the present disclosure.

Please refers to FIG. 2, FIG. 2 is a structure schematic view of a voltage controlling circuit of a T-CON load variation according to a first embodiment of the present disclosure. As shown in FIG. 2, the controlling circuit may include: a power source chip (IC) and a voltage controlling circuit. As shown in FIG. 2, the voltage controlling circuit 20 may include a photoelectric coupler 201, a first comparator OP1, a second comparator OP2, a field effect transistor G38 and a field effect transistor G36.

A first pin 1 of the photoelectric coupler 201 is coupled to the other terminal of an inductor L8, one terminal of the inductor L8 is connected to a voltage output terminal LX of the power source chip, a second pin 2 of the photoelectric coupler 201 is connected to an output terminal of a core voltage Vcore, a third pin 3 of the photoelectric coupler 201 is connected to the other terminal of a resistor R172, one terminal of the resistor R172 is connected to a ground, and a fourth pin 4 of the photoelectric coupler 201 is connected to a voltage source VCC1.

A positive power terminal of the first comparator OP1 is connected to a second voltage source VCC2, a negative power terminal of the first comparator OP1 is connected to an equivalent electric potential point, a positive input terminal of the first comparator OP1 is connected to the third pin 3 of the photoelectric coupler, a negative input terminal of the first comparator OP1 is connected to a first comparing voltage Vref1, and an output terminal output1 of the first comparator OP1 is connected to a gate G of the field effect transistor G36; a positive power terminal of the second comparator OP2 is connected to the second voltage source VCC2, a negative power terminal of the second comparator OP2 is connected to an equivalent electric potential point, a negative input terminal of the second comparator OP2 is connected to the third pin 3 of the photoelectric coupler, a positive input terminal of the second comparator OP2 is connected to a second comparing voltage Vref2, and an output terminal output2 of the second comparator OP2 is connected to a gate G of the field effect transistor G38.

A drain D of the field effect transistor G38 is connected to the core voltage Vcore, a source S of the field effect transistor G38 is connected to one terminal of a resistor R620, the other terminal of the resistor R620 is connected to a feedback voltage terminal FB of the power source chip, a drain D of the field effect transistor G36 is connected to the other terminal of a resistor R622, one terminal of the resistor R622 is connected to the feedback voltage terminal FB of the power source chip, and a source S of the field effect transistor G36 is connected to the ground.

It should be explained that a specific model number of the above power source chip may be: SY8113. Of course, in the practical application, it may be replaced with chip with other model number. In a first embodiment of the present disclosure, the power source chip model is not limited.

The above LX terminal may specifically be the voltage output terminal of the power source chip. In the first embodiment of the present disclosure, the voltage output terminal may be defined as the LX terminal. Of course, in other embodiments of the present disclosure, the voltage output terminal may also be defined as other names. In the specific embodiment of the present disclosure, the name of the voltage output terminal is not relevantly limited.

The above FB terminal may specifically be the feedback voltage terminal of the power source chip. In the first embodiment of the present disclosure, the feedback voltage terminal may be defined as the FB terminal. Of course, in other embodiments of the present disclosure, the feedback voltage terminal may be defined as other names. In the specific embodiment of the present disclosure, the name of the feedback voltage terminal is not relevantly limited.

The technical effect achieved by the first embodiment of the present disclosure will be described through a circuit principle of the first embodiment of the present disclosure as follows.

Under a normal load condition, i.e. IM<IVcore<IN, at this time, Vref2<VA<Vref1, Output1 of the first comparator OP1 outputs a low level and Output2 of the second comparator OP2 outputs a low level, such that the field effect transistor Q36 and the field effect transistor Q38 is turned off. At this time, it is equivalent to that the voltage control circuit does not work. The voltage of Vcore does not change, and Vcore=VFB+VFB*R196/R197.

When the load becomes large, i.e. IVcore>IN, since the load becomes large, the voltage of Vcore is decreased, the current of IVcore is increased, such that increase of the current of IVcore results in that the current from the first pin 1 of the photoelectric coupler 201 to the second pin 2 of the photoelectric coupler 201 increases, and the increase of the current from the first pin 1 of the photoelectric coupler 201 to the second pin 2 of the photoelectric coupler 201 results in that the current from the third pin 3 of the photoelectric coupler 201 to the fourth pin 4 of the photoelectric coupler 201 increases, so as to increase VA. At this time, VA>Vref1>Vref2, Output1 is at a high level and Output2 is at a low level, such that Q36 is turned on and Q38 is turned off. Thus Vcore=VFB+VFB*R196/(R197//R622), and the voltage of Vcore is increased with the increase of the load.

When the load becomes small, i.e. IVcore<IN, since the load becomes small, the voltage of Vcore is increased, and the current of IVcore is decreased, thereby decreasing the voltage of VA. At this time, VA<Vref1<Vref2, Output1 is at a low level and Output2 is at a high level, such that Q36 is turned off and Q38 is turned on, thus Vcore=VFB+VFB*(R196//R620)/R197, and the voltage of Vcore is decreased follow the decrease of the load.

The above IM may be a minimum current value of IVcore under the normal load condition, and the IN may be a maximum current value of IVcore under the normal load condition.

Therefore, in the technical scheme of the first embodiment of the present disclosure, the voltage Vcore of the T-CON Core Power may automatically vary with the variation of the load, so as to increase stability of the voltage of T-CON Core Power, and ensure that T-CON may normally work under the any condition.

Figure 3:
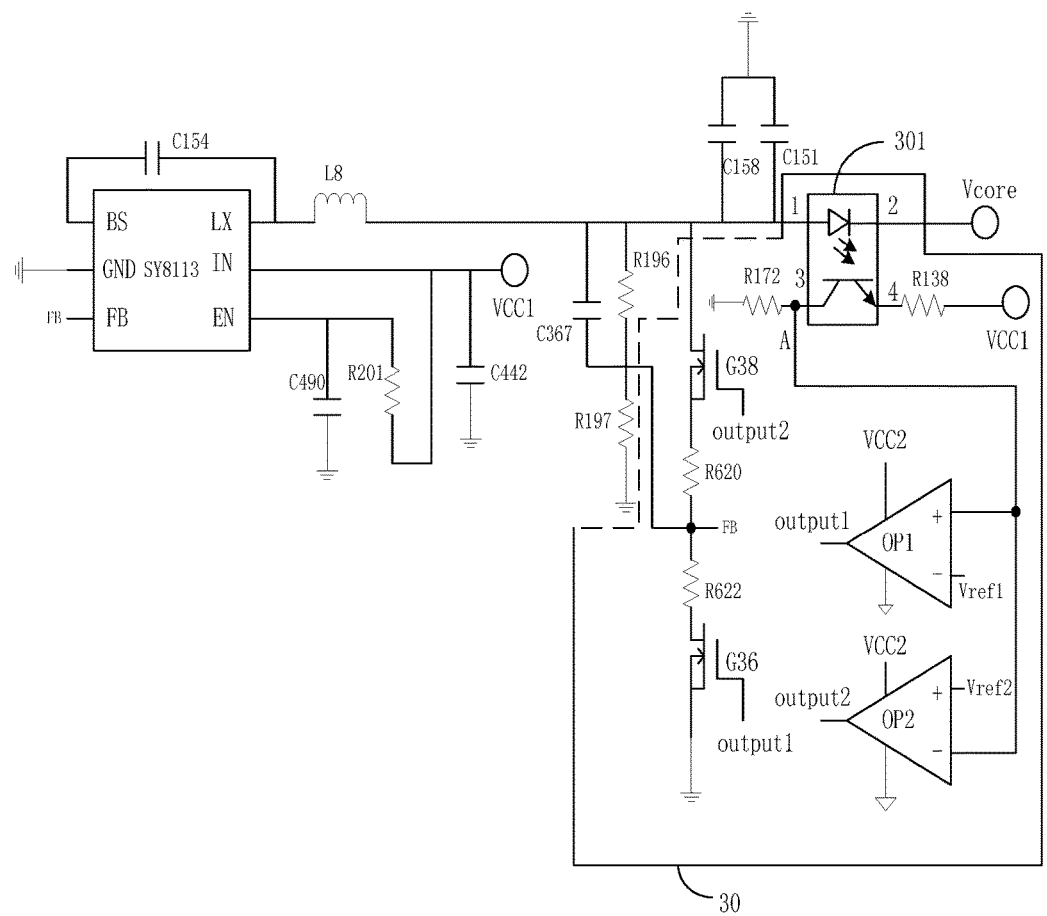
FIG. 3 is a structure schematic view of a voltage controlling circuit of a T-CON load variation according to a second embodiment of the present disclosure.

Please refers to FIG. 3, FIG. 3 is a structure schematic view of a voltage controlling circuit of a T-CON load variation according to a second embodiment of the present disclosure. As shown in FIG. 3, the controlling circuit may include: a power source chip (IC) and a voltage controlling circuit. As shown in FIG. 3, the voltage controlling circuit 30 may include a photoelectric coupler 301, a first comparator OP1, a second comparator OP2, a field effect transistor G38 and a field effect transistor G36.

A first pin 1 of the photoelectric coupler 301 is coupled to the other terminal of an inductor L8, one terminal of the inductor L8 is connected to a voltage output terminal LX of the power source chip, a second pin 2 of the photoelectric coupler 301 is connected to an output terminal of a core voltage Vcore, a third pin 3 of the photoelectric coupler 301 is connected to the other terminal of a resistor R172, one terminal of the resistor R172 is connected to a ground, a fourth pin 4 of the photoelectric coupler 201 is connected to one terminal of a resistor R138, and the other terminal of the resistor R138 is connected to a voltage source VCC1.

A positive power terminal of the first comparator OP1 is connected to a second voltage source VCC2, a negative power terminal of the first comparator OP1 is connected to an equivalent electric potential point, a positive input terminal of the first comparator OP1 is connected to the third pin 3 of the photoelectric coupler, a negative input terminal of the first comparator OP1 is connected to a first comparing voltage Vref1, and an output terminal output1 of the first comparator OP1 is connected to a gate G of the field effect transistor G36; a positive power terminal of the second comparator OP2 is connected to the second voltage source VCC2, a negative power terminal of the second comparator OP2 is connected to an equivalent electric potential point, a negative input terminal of the second comparator OP2 is connected to the third pin 3 of the photoelectric coupler, a positive input terminal of the second comparator OP2 is connected to a second comparing voltage Vref2, and an output terminal output2 of the second comparator OP2 is connected to a gate G of the field effect transistor G38.

A drain D of the field effect transistor G38 is connected to the core voltage Vcore, a source S of the field effect transistor G38 is connected to one terminal of a resistor R620, the other terminal of the resistor R620 is connected to a feedback voltage terminal FB of the power source chip, a drain D of the field effect transistor G36 is connected to the other terminal of a resistor R622, one terminal of the resistor R622 is connected to the feedback voltage terminal FB of the power source chip, and a source S of the field effect transistor G36 is connected to the ground.

It should be explained that a specific model number of the above power source chip may be: SY8113. Of course, in the practical application, it may be replaced with chip with other model number. In a second embodiment of the present disclosure, the power source chip model is not limited.

The above LX terminal may specifically be the voltage output terminal of the power source chip. In the second embodiment of the present disclosure, the voltage output terminal may be defined as the LX terminal. Of course, in other embodiments of the present disclosure, the voltage output terminal may also be defined as other names. In the specific embodiment of the present disclosure, the name of the voltage output terminal is not relevantly limited.

In one embodiment of the second embodiment of the present disclosure, a value of the second voltage source VCC2 may be a voltage source with 5V. Of course, in another embodiment of the second embodiment of the present disclosure, the second voltage source VCC2 may be a voltage source with 3.3V. In addition, a voltage value of the voltage source VCC1 may be the same as the value of the voltage source VCC2; of course, the voltage source may be different voltage value. In the present disclosure, the voltage values of the voltage source VCC1 and the voltage source VCC2 are not limited.

The above FB terminal may specifically be the feedback voltage terminal of the power source chip. In the second embodiment of the present disclosure, the feedback voltage terminal may be defined as the FB terminal. Of course, in other embodiments of the present disclosure, the feedback voltage terminal may be defined as other names. In the specific embodiment of the present disclosure, the name of the feedback voltage terminal is not relevantly limited.

The technical effect achieved by the second embodiment of the present disclosure will be described through a circuit principle of the second embodiment of the present disclosure as follows.

Under a normal load condition, i.e. IM<IVcore<IN, at this time, Vref2<VA<Vref1, Output1 of the first comparator OP1 outputs a low level and Output2 of the second comparator OP2 outputs a low level, such that the field effect transistor Q36 and the field effect transistor Q38 is turned off. At this time, it is equivalent to the voltage control circuit does not work. The voltage of Vcore does not change, and Vcore=VFB+VFB*R196/R197.

When the load becomes large, i.e. IVcore>IN, since the load becomes large, the voltage of Vcore is decreased, the current of IVcore is increased, such that increase of the current of IVcore results in that the current from the first pin 1 of the photoelectric coupler 301 to the second pin 2 of the photoelectric coupler 301 increases, and the increase of the current from the first pin 1 of the photoelectric coupler 201 to the second pin 2 of the photoelectric coupler 201 results in that the current from the third pin 3 of the photoelectric coupler 301 to the fourth pin 4 of the photoelectric coupler 301 increases, so as to increase VA. At this time, VA>Vref1>Vref2, Output1 at is a high level and Output2 is at a low level, such that Q36 is turned on and Q38 is turned off. Thus Vcore=VFB+VFB*R196/(R197//R622), and the voltage of Vcore is increased with the increase of the load. (R197//R622) indicates that a parallel resistor of the resistor R197 and the resistor R622.

When the load becomes small, i.e. IVcore<IN, since the load becomes small, the voltage of Vcore is increased, and the current of IVcore is decreased, thereby decreasing the voltage of VA. At this time, VA<Vref1<Vref2, Output1 is at a low level and Output2 is at a high level, such that Q36 is turned off and Q38 is turned on, thus Vcore=VFB+VFB*(R196//R620)/R197, and the voltage of Vcore is decreased with the decrease of the load. (R196//R620) indicates that a parallel resistor of the resistor R196 and the resistor R620.

The above IM may be a minimum current value of IVcore under the normal load condition, and the IN may be a maximum current value of IVcore under the normal load condition. In addition, after adding the resistor R138, it may limit a current magnitude of the photoelectric coupler 301 to protect the photoelectric coupler 301. Thus, it has an advantage of increasing safety.

Therefore, in the technical scheme of the second embodiment of the present disclosure, the voltage Vcore of the T-CON Core Power may automatically vary with the variation of the load, so as to increase a stability of the voltage of T-CON Core Power, and ensure that T-CON may normally work under the any condition.

Figure 4:
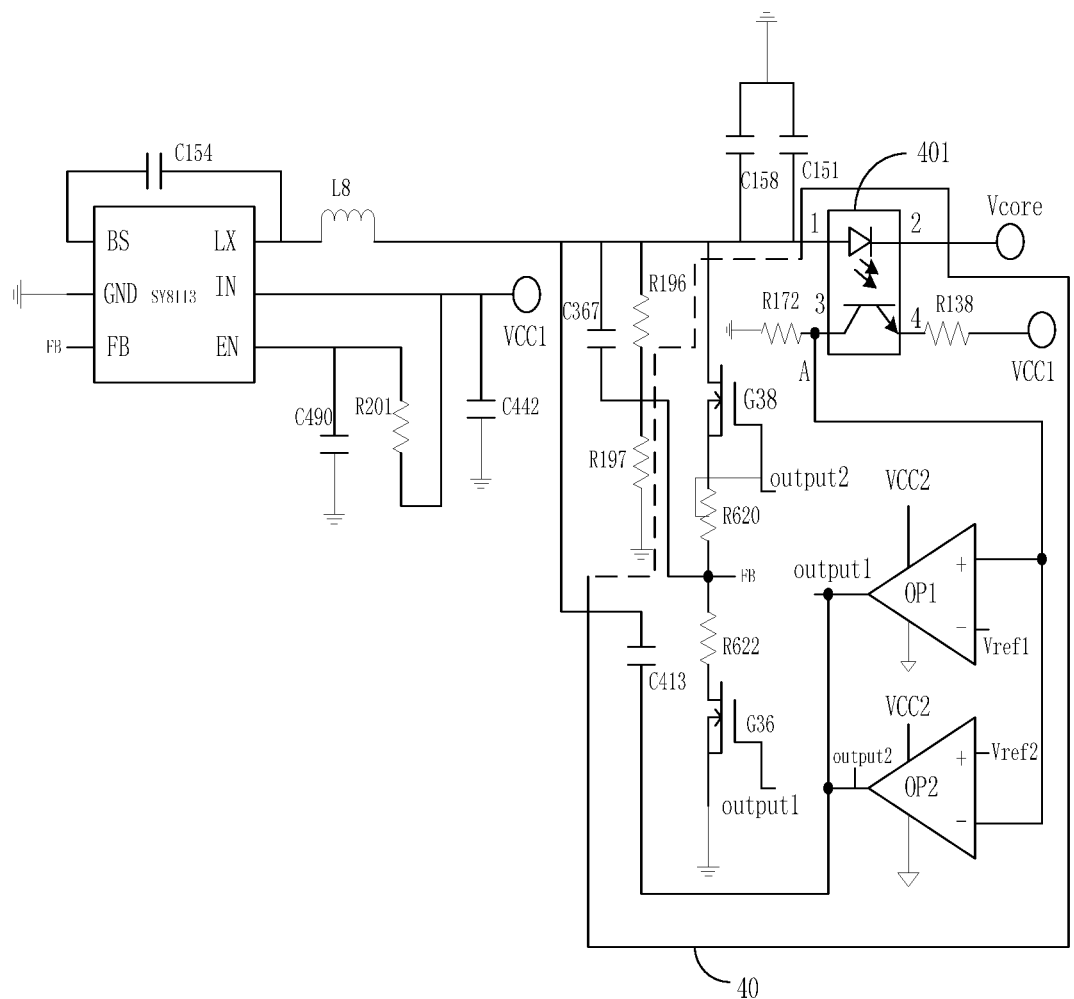
FIG. 4 is a structure schematic view of a voltage controlling circuit of a T-CON load variation according to a third embodiment of the present disclosure.

Please refers to FIG. 4, FIG. 4 is a structure schematic view of a voltage controlling circuit of a T-CON load variation according to a third embodiment of the present disclosure. As shown in FIG. 4, the controlling circuit may include: a power source chip (IC) and a voltage controlling circuit. As shown in FIG. 4, the voltage controlling circuit 40 may include a photoelectric coupler 301, a first comparator OP1, a second comparator OP2, a field effect transistor G38 and a field effect transistor G36.

A first pin 1 of the photoelectric coupler 401 is coupled to the other terminal of an inductor L8, one terminal of the inductor L8 is connected to a voltage output terminal LX of the power source chip, a second pin 2 of the photoelectric coupler 401 is connected to an output terminal of a core voltage Vcore, a third pin 3 of the photoelectric coupler 301 is connected to the other terminal of a resistor R172, one terminal of the resistor R172 is connected to a ground, a fourth pin 4 of the photoelectric coupler 201 is connected to one terminal of a resistor R138, and the other terminal of the resistor R138 is connected to a voltage source VCC1.

A positive power terminal of the first comparator OP1 is connected to a second voltage source VCC2, a negative power terminal of the first comparator OP1 is connected to an equivalent electric potential point, a positive input terminal of the first comparator OP1 is connected to the third pin 3 of the photoelectric coupler, a negative input terminal of the first comparator OP1 is connected to a first comparing voltage Vref1, and an output terminal output1 of the first comparator OP1 is connected to a gate G of the field effect transistor G36; a positive power terminal of the second comparator OP2 is connected to the second voltage source VCC2, a negative power terminal of the second comparator OP2 is connected to an equivalent electric potential point, a negative input terminal of the second comparator OP2 is connected to the third pin 3 of the photoelectric coupler, a positive input terminal of the second comparator OP2 is connected to a second comparing voltage Vref2, and an output terminal output2 of the second comparator OP2 is connected to a gate G of the field effect transistor G38.

A drain D of the field effect transistor G38 is connected to the core voltage Vcore, a source S of the field effect transistor G38 is connected to one terminal of a resistor R620, the other terminal of the resistor R620 is connected to a feedback voltage terminal FB of the power source chip, a drain D of the field effect transistor G36 is connected to the other terminal of a resistor R622, one terminal of the resistor R622 is connected to the feedback voltage terminal FB of the power source chip, and a source S of the field effect transistor G36 is connected to the ground. One terminal of a capacitor C413 is connected to the other terminal of the inductor, and the other terminal of the capacitor C413 is respectively connected to the output terminal of the first comparator OP1 and the output terminal of the second comparator OP2.

It should be explained that a specific model number of the above power source chip may be: SY8113. Of course, in the practical application, it may be replaced with chip with other model number. In a third embodiment of the present disclosure, the power source chip model is not limited.

The above LX terminal may specifically be the voltage output terminal of the power source chip. In the third embodiment of the present disclosure, the voltage output terminal may be defined as the LX terminal. Of course, in other embodiments of the present disclosure, the voltage output terminal may also be defined as other names. In the specific embodiment of the present disclosure, the name of the voltage output terminal is not relevantly limited.

In one embodiment of the third embodiment of the present disclosure, a value of the second voltage source VCC2 may be a voltage source with 5V. Of course, in another embodiment of the third embodiment of the present disclosure, the second voltage source VCC2 may be a voltage source with 3.3V. In addition, a voltage value of the voltage source VCC1 may be the same as the value of the voltage source VCC2; of course, the voltage source may be different voltage value. In the present disclosure, the voltage values of the voltage source VCC1 and the voltage source VCC2 are not limited.

The above FB terminal may specifically be the feedback voltage terminal of the power source chip. In the third embodiment of the present disclosure, the feedback voltage terminal may be defined as the FB terminal. Of course, in other embodiments of the present disclosure, the feedback voltage terminal may be defined as other names. In the specific embodiment of the present disclosure, the name of the feedback voltage terminal is not relevantly limited.

The technical effect achieved by the third embodiment of the present disclosure will be described through a circuit principle of the third embodiment of the present disclosure as follows.

Under a normal load condition, i.e. IM<IVcore<IN, at this time, Vref2<VA<Vref1, Output1 of the first comparator OP1 outputs a low level and Output2 of the second comparator OP2 outputs a low level, such that the field effect transistor Q36 and the field effect transistor Q38 is turned off. At this time, it is equivalent to the voltage control circuit does not work, the voltage of Vcore does not change, and Vcore=VFB+VFB*R196/R197.

When the load becomes large, i.e. IVcore>IN, since the load becomes large, the voltage of Vcore is decreased, the current of IVcore is increased, such that increase of the current of IVcore results in that the current from the first pin 1 of the photoelectric coupler 401 to the second pin 2 of the photoelectric coupler 401 increases, and the increase of the current from the first pin 1 of the photoelectric coupler 401 to the second pin 2 of the photoelectric coupler 401 results in that the current from the third pin 3 of the photoelectric coupler 401 to the fourth pin 4 of the photoelectric coupler 401 increases, so as to increase VA. At this time, VA>Vref1>Vref2, Output1 is at a high level and Output2 is at a low level, such that Q36 is turned on and Q38 is turned off, thus Vcore=VFB+VFB*R196/(R197//R622), and the voltage of Vcore is increased with the increase of the load.

When the load becomes small, i.e. IVcore<IN, since the load becomes small, the voltage of Vcore is increased, and the current of IVcore is decreased, thereby decreasing the voltage of VA. At this time, VA<Vref1<Vref2, Output1 is at a low level and Output2 is at a high level, such that Q36 is turned off and Q38 is turned on, thus Vcore=VFB+VFB*(R196//R620)/R197, and the voltage of Vcore is decreased with the decrease of the load.

The above IM may be a minimum current value of IVcore under the normal load condition, and the IN may be a maximum current value of IVcore under the normal load condition. In addition, after adding the resistor R138, it may limit a current magnitude of the photoelectric coupler 301 to protect the photoelectric coupler 301. Thus, it has an advantage of increasing safety.

In the third embodiment of the present disclosure, the capacitor C413 is added and is disposed between the output terminal of the comparator and L8, it may decrease a conducting speed of the field effect transistor G38 and the field effect transistor G36, so as to avoid the surge current for affecting the power source chip is generated easily due to the conducting speed of the field effect transistor is too fast.

Therefore, in the technical scheme of the third embodiment of the present disclosure, the voltage Vcore of the T-CON Core Power may automatically vary with the variation of the load, so as to increase a stability of the voltage of T-CON Core Power, and ensure that T-CON may normally work under the any condition.

The specific embodiment of the present disclosure further provides a display panel, and the display panel includes: a voltage controlling circuit of a T-CON load. Please refers to FIG. 2, FIG. 2 is a structure schematic view of a voltage controlling circuit of a T-CON load variation according to a first embodiment of the present disclosure. As shown in FIG. 2, the controlling circuit may include: a power source chip (IC) and a voltage controlling circuit. As shown in FIG. 2, the voltage controlling circuit 20 may include a photoelectric coupler 201, a first comparator OP1, a second comparator OP2, a field effect transistor G38 and a field effect transistor G36.

A first pin 1 of the photoelectric coupler 201 is coupled to the other terminal of an inductor L8, one terminal of the inductor L8 is connected to a voltage output terminal LX of the power source chip, a second pin 2 of the photoelectric coupler 201 is connected to an output terminal of a core voltage Vcore, a third pin 3 of the photoelectric coupler 201 is connected to the other terminal of a resistor R172, one terminal of the resistor R172 is connected to a ground, and a fourth pin 4 of the photoelectric coupler 201 is connected to a voltage source VCC1.

A positive power terminal of the first comparator OP1 is connected to a second voltage source VCC2, a negative power terminal of the first comparator OP1 is connected to an equivalent electric potential point, a positive input terminal of the first comparator OP1 is connected to the third pin 3 of the photoelectric coupler, a negative input terminal of the first comparator OP1 is connected to a first comparing voltage Vref1, and an output terminal output1 of the first comparator OP1 is connected to a gate G of the field effect transistor G36; a positive power terminal of the second comparator OP2 is connected to the second voltage source VCC2, a negative power terminal of the second comparator OP2 is connected to an equivalent electric potential point, a negative input terminal of the second comparator OP2 is connected to the third pin 3 of the photoelectric coupler, a positive input terminal of the second comparator OP2 is connected to a second comparing voltage Vref2, and an output terminal output2 of the second comparator OP2 is connected to a gate G of the field effect transistor G38.

A drain D of the field effect transistor G38 is connected to the core voltage Vcore, a source S of the field effect transistor G38 is connected to one terminal of a resistor R620, the other terminal of the resistor R620 is connected to a feedback voltage terminal FB of the power source chip, a drain D of the field effect transistor G36 is connected to the other terminal of a resistor R622, one terminal of the resistor R622 is connected to the feedback voltage terminal FB of the power source chip, and a source S of the field effect transistor G36 is connected to the ground.

It should be explained that a specific model number of the above power source chip may be: SY8113. Of course, in the practical application, it may be replaced with chip with other model number. In a first embodiment of the present disclosure, the power source chip model is not limited.

The above LX terminal may specifically be the voltage output terminal of the power source chip. In the first embodiment of the present disclosure, the voltage output terminal may be defined as the LX terminal. Of course, in other embodiments of the present disclosure, the voltage output terminal may also be defined as other names. In the specific embodiment of the present disclosure, the name of the voltage output terminal is not relevantly limited.

The above FB terminal may specifically be the feedback voltage terminal of the power source chip. In the first embodiment of the present disclosure, the feedback voltage terminal may be defined as the FB terminal. Of course, in other embodiments of the present disclosure, the feedback voltage terminal may be defined as other names. In the specific embodiment of the present disclosure, the name of the feedback voltage terminal is not relevantly limited.

The technical effect achieved by the first embodiment of the present disclosure will be described through a circuit principle of the first embodiment of the present disclosure as follows.

Under a normal load condition, i.e. IM<IVcore<IN, at this time, Vref2<VA<Vref1, Output1 of the first comparator OP1 outputs a low level and Output2 of the second comparator OP2 outputs a low level, such that the field effect transistor Q36 and the field effect transistor Q38 is turned off. At this time, it is equivalent to the voltage control circuit does not work, the voltage of Vcore does not change, and Vcore=VFB+VFB*R196/R197.

When the load becomes large, i.e. IVcore>IN, since the load becomes large, the voltage of Vcore is decreased, the current of IVcore is increased, such that increase of the current of IVcore results in that the current from the first pin 1 of the photoelectric coupler 201 to the second pin 2 of the photoelectric coupler 201 increases, and the increase of the current from the first pin 1 of the photoelectric coupler 201 to the second pin 2 of the photoelectric coupler 201 results in that the current from the third pin 3 of the photoelectric coupler 201 to the fourth pin 4 of the photoelectric coupler 201 increases, so as to increase VA. At this time, VA>Vref1>Vref2, Output1 is at a high level and Output2 is at a low level, such that Q36 is turned on and Q38 is turned off. Thus Vcore=VFB+VFB*R196/(R197//R622), and the voltage of Vcore is increased with the increase of the load.

When the load becomes small, i.e. IVcore<IN, since the load becomes small, the voltage of Vcore is increased, and the current of IVcore is decreased, thereby decreasing the voltage of VA. At this time, VA<Vref1<Vref2, Output1 is at a low level and Output2 is at a high level, such that Q36 is turned off and Q38 is turned on, thus Vcore=VFB+VFB*(R196//R620)/R197, and the voltage of Vcore is decreased with the decrease of the load.

The above IM may be a minimum current value of IVcore under the normal load condition, and the IN may be a maximum current value of IVcore under the normal load condition.

Therefore, in the technical scheme of the first embodiment of the present disclosure, the voltage Vcore of the T-CON Core Power may automatically vary with the variation of the load, so as to increase a stability of the voltage of T-CON Core Power, and ensure that T-CON may normally work under the any condition.

Please refers to FIG. 3, FIG. 3 is a structure schematic view of a voltage controlling circuit of a T-CON load variation according to a second embodiment of the present disclosure. As shown in FIG. 3, the controlling circuit may include: a power source chip (IC) and a voltage controlling circuit. As shown in FIG. 3, the voltage controlling circuit 30 may include a photoelectric coupler 301, a first comparator OP1, a second comparator OP2, a field effect transistor G38 and a field effect transistor G36.

A first pin 1 of the photoelectric coupler 301 is coupled to the other terminal of an inductor L8, one terminal of the inductor L8 is connected to a voltage output terminal LX of the power source chip, a second pin 2 of the photoelectric coupler 301 is connected to an output terminal of a core voltage Vcore, a third pin 3 of the photoelectric coupler 301 is connected to the other terminal of a resistor R172, one terminal of the resistor R172 is connected to a ground, a fourth pin 4 of the photoelectric coupler 201 is connected to one terminal of a resistor R138, and the other terminal of the resistor R138 is connected to a voltage source VCC1.

A positive power terminal of the first comparator OP1 is connected to a second voltage source VCC2, a negative power terminal of the first comparator OP1 is connected to an equivalent electric potential point, a positive input terminal of the first comparator OP1 is connected to the third pin 3 of the photoelectric coupler, a negative input terminal of the first comparator OP1 is connected to a first comparing voltage Vref1, and an output terminal output1 of the first comparator OP1 is connected to a gate G of the field effect transistor G36; a positive power terminal of the second comparator OP2 is connected to the second voltage source VCC2, a negative power terminal of the second comparator OP2 is connected to an equivalent electric potential point, a negative input terminal of the second comparator OP2 is connected to the third pin 3 of the photoelectric coupler, a positive input terminal of the second comparator OP2 is connected to a second comparing voltage Vref2, and an output terminal output2 of the second comparator OP2 is connected to a gate G of the field effect transistor G38.

A drain D of the field effect transistor G38 is connected to the core voltage Vcore, a source S of the field effect transistor G38 is connected to one terminal of a resistor R620, the other terminal of the resistor R620 is connected to a feedback voltage terminal FB of the power source chip, a drain D of the field effect transistor G36 is connected to the other terminal of a resistor R622, one terminal of the resistor R622 is connected to the feedback voltage terminal FB of the power source chip, and a source S of the field effect transistor G36 is connected to the ground.

It should be explained that a specific model number of the above power source chip may be: SY8113. Of course, in the practical application, it may be replaced with chip with other model number. In a second embodiment of the present disclosure, the power source chip model is not limited.

The above LX terminal may specifically be the voltage output terminal of the power source chip. In the second embodiment of the present disclosure, the voltage output terminal may be defined as the LX terminal. Of course, in other embodiments of the present disclosure, the voltage output terminal may also be defined as other names. In the specific embodiment of the present disclosure, the name of the voltage output terminal is not relevantly limited.

In one embodiment of the second embodiment of the present disclosure, a value of the second voltage source VCC2 may be a voltage source with 5V. Of course, in another embodiment of the second embodiment of the present disclosure, the second voltage source VCC2 may be a voltage source with 3.3V. In addition, a voltage value of the voltage source VCC1 may be the same as the value of the voltage source VCC2; of course, the voltage source may be different voltage value. In the present disclosure, the voltage values of the voltage source VCC1 and the voltage source VCC2 are not limited.

The above FB terminal may specifically be the feedback voltage terminal of the power source chip. In the second embodiment of the present disclosure, the feedback voltage terminal may be defined as the FB terminal. Of course, in other embodiments of the present disclosure, the feedback voltage terminal may be defined as other names. In the specific embodiment of the present disclosure, the name of the feedback voltage terminal is not relevantly limited.

The technical effect achieved by the second embodiment of the present disclosure will be described through a circuit principle of the second embodiment of the present disclosure as follows.

Under a normal load condition, i.e. IM<IVcore<IN, at this time, Vref2<VA<Vref1, Output1 of the first comparator OP1 outputs a low level and Output2 of the second comparator OP2 outputs a low level, such that the field effect transistor Q36 and the field effect transistor Q38 is turned off. At this time, it is equivalent to the voltage control circuit does not work, the voltage of Vcore does not change, and Vcore=VFB+VFB*R196/R197.

When the load becomes large, i.e. IVcore>IN, since the load becomes large, the voltage of Vcore is decreased, the current of IVcore is increased, such that increase of the current of IVcore results in that the current from the first pin 1 of the photoelectric coupler 301 to the second pin 2 of the photoelectric coupler 301 increases, and the increase of the current from the first pin 1 of the photoelectric coupler 301 to the second pin 2 of the photoelectric coupler 301 results in that the current from the third pin 3 of the photoelectric coupler 301 to the fourth pin 4 of the photoelectric coupler 301 increases, so as to increase VA. At this time, VA>Vref1>Vref2, Output1 is at a high level and Output2 is at a low level, such that Q36 is turned on and Q38 is turned off. Thus Vcore=VFB+VFB*R196/(R197//R622), and the voltage of Vcore is increased with the increase of the load.

When the load becomes small, i.e. IVcore<IN, since the load becomes small, the voltage of Vcore is increased, and the current of IVcore is decreased, thereby decreasing the voltage of VA. At this time, VA<Vref1<Vref2, Output1 is at a low level and Output2 is at a high level, such that Q36 is turned off and Q38 is turned on, thus Vcore=VFB+VFB*(R196//R620)/R197, and the voltage of Vcore is decreased with the decrease of the load.

The above IM may be a minimum current value of IVcore under the normal load condition, and the IN may be a maximum current value of IVcore under the normal load condition. In addition, after adding the resistor R138, it may limit a current magnitude of the photoelectric coupler 301 to protect the photoelectric coupler 301. Thus, it has an advantage of increasing safety.

Therefore, in the technical scheme of the second embodiment of the present disclosure, the voltage Vcore of the T-CON Core Power may automatically vary with the variation of the load, so as to increase a stability of the voltage of T-CON Core Power, and ensure that T-CON may normally work under the any condition.

Please refers to FIG. 4, FIG. 4 is a structure schematic view of a voltage controlling circuit of a T-CON load variation according to a third embodiment of the present disclosure. As shown in FIG. 4, the controlling circuit may include: a power source chip (IC) and a voltage controlling circuit. As shown in FIG. 4, the voltage controlling circuit 40 may include a photoelectric coupler 301, a first comparator OP1, a second comparator OP2, a field effect transistor G38 and a field effect transistor G36.

A first pin 1 of the photoelectric coupler 401 is coupled to the other terminal of an inductor L8, one terminal of the inductor L8 is connected to a voltage output terminal LX of the power source chip, a second pin 2 of the photoelectric coupler 401 is connected to an output terminal of a core voltage Vcore, a third pin 3 of the photoelectric coupler 301 is connected to the other terminal of a resistor R172, one terminal of the resistor R172 is connected to a ground, a fourth pin 4 of the photoelectric coupler 201 is connected to one terminal of a resistor R138, and the other terminal of the resistor R138 is connected to a voltage source VCC1.

A positive power terminal of the first comparator OP1 is connected to a second voltage source VCC2, a negative power terminal of the first comparator OP1 is connected to an equivalent electric potential point, a positive input terminal of the first comparator OP1 is connected to the third pin 3 of the photoelectric coupler, a negative input terminal of the first comparator OP1 is connected to a first comparing voltage Vref1, and an output terminal output1 of the first comparator OP1 is connected to a gate G of the field effect transistor G36; a positive power terminal of the second comparator OP2 is connected to the second voltage source VCC2, a negative power terminal of the second comparator OP2 is connected to an equivalent electric potential point, a negative input terminal of the second comparator OP2 is connected to the third pin 3 of the photoelectric coupler, a negative input terminal of the second comparator OP2 is connected to a second comparing voltage Vref2, and an output terminal output2 of the second comparator OP2 is connected to a gate G of the field effect transistor G38.

A drain D of the field effect transistor G38 is connected to the core voltage Vcore, a source S of the field effect transistor G38 is connected to one terminal of a resistor R620, the other terminal of the resistor R620 is connected to a feedback voltage terminal FB of the power source chip, a drain D of the field effect transistor G36 is connected to the other terminal of a resistor R622, one terminal of the resistor R622 is connected to the feedback voltage terminal FB of the power source chip, and a source S of the field effect transistor G36 is connected to the ground. One terminal of a capacitor C413 is connected to the other terminal of the inductor, and the other terminal of the capacitor C413 is respectively connected to the output terminal of the first comparator OP1 and the output terminal of the second comparator OP2.

It should be explained that a specific model number of the above power source chip may be: SY8113. Of course, in the practical application, it may be replaced with chip with other model number. In a third embodiment of the present disclosure, the power source chip model is not limited.

The above LX terminal may specifically be the voltage output terminal of the power source chip. In the third embodiment of the present disclosure, the voltage output terminal may be defined as the LX terminal. Of course, in other embodiments of the present disclosure, the voltage output terminal may also be defined as other names. In the specific embodiment of the present disclosure, the name of the voltage output terminal is not relevantly limited.

In one embodiment of the third embodiment of the present disclosure, a value of the second voltage source VCC2 may be a voltage source with 5V. Of course, in another embodiment of the third embodiment of the present disclosure, the second voltage source VCC2 may be a voltage source with 3.3V. In addition, a voltage value of the voltage source VCC1 may be the same as the value of the voltage source VCC2; of course, the voltage source may be different voltage value. In the present disclosure, the voltage values of the voltage source VCC1 and the voltage source VCC2 are not limited.

The above FB terminal may specifically be the feedback voltage terminal of the power source chip. In the third embodiment of the present disclosure, the feedback voltage terminal may be defined as the FB terminal. Of course, in other embodiments of the present disclosure, the feedback voltage terminal may be defined as other names. In the specific embodiment of the present disclosure, the name of the feedback voltage terminal is not relevantly limited.

The technical effect achieved by the third embodiment of the present disclosure will be described through a circuit principle of the third embodiment of the present disclosure as follows.

Under a normal load condition, i.e. IM<IVcore<IN, at this time, Vref2<VA<Vref1, Output1 of the first comparator OP1 outputs a low level and Output2 of the second comparator OP2 outputs a low level, such that the field effect transistor Q36 and the field effect transistor Q38 is turned off. At this time, it is equivalent to the voltage control circuit does not work, the voltage of Vcore does not change, and Vcore=VFB+VFB*R196/R197.

When the load becomes large, i.e. IVcore>IN, since the load becomes large, the voltage of Vcore is decreased, the current of IVcore is increased, such that increase of the current of IVcore results in that the current from the first pin 1 of the photoelectric coupler 401 to the second pin 2 of the photoelectric coupler 401 increases, and the increase of the current from the first pin 1 of the photoelectric coupler 401 to the second pin 2 of the photoelectric coupler 401 results in that the current from the third pin 3 of the photoelectric coupler 401 to the fourth pin 4 of the photoelectric coupler 401 increases, so as to increase VA. At this time, VA>Vref1>Vref2, Output1 is at a high level and Output2 is at a low level, such that Q36 is turned on and Q38 is turned off, thus Vcore=VFB+VFB*R196/(R197//R622), and the voltage of Vcore is increased with the increase of the load.

When the load becomes small, i.e. IVcore<IN, since the load becomes small, the voltage of Vcore is increased, and the current of IVcore is decreased, thereby decreasing the voltage of VA. At this time, VA<Vref1<Vref2, Output1 is at a low level and Output2 is at a high level, such that Q36 is turned off and Q38 is turned on, thus Vcore=VFB+VFB* (R196//R620)/R197, and the voltage of Vcore is decreased with the decrease of the load.

The above IM may be a minimum current value of IVcore under the normal load condition, and the IN may be a maximum current value of IVcore under the normal load condition. In addition, after adding the resistor R138, it may limit a current magnitude of the photoelectric coupler 301 to protect the photoelectric coupler 301. Thus, it has an advantage of increasing safety.

In the third embodiment of the present disclosure, the capacitor C413 is added and is disposed between the output terminal of the comparator and the inductor L8, it may decrease a conducting speed of the field effect transistor G38 and the field effect transistor G36, so as to avoid the surge current for affecting the power source chip is generated easily due to the conducting speed of the field effect transistor is too fast.

Therefore, in the technical scheme of the third embodiment of the present disclosure, the voltage Vcore of the T-CON Core Power may automatically vary with the variation of the load, so as to increase a stability of the voltage of T-CON Core Power, and ensure that T-CON may normally work under the any condition.

In addition, the specific embodiment of the present disclosure further provides a display device, and the display device includes a display panel, wherein the display panel includes a voltage controlling circuit of a T-CON load. A specific structure of the voltage controlling circuit of the T-CON load may refer to the descriptions of the first embodiment, the second embodiment and the third embodiment of the present disclosure, thus the description thereof is omitted.

The above present disclosure is merely an embodiment of the present disclosure and does not intend to limit the claim scope of the present disclosure. Those having ordinary knowledge in the related art may realize all or part of the process to achieve the above embodiments and may conduct equivalent variation on the claims of the present disclosure, which belongs to the scope covered by the present disclosure.

What is claimed is:

1. A voltage controlling circuit of a T-CON load variation, wherein the voltage controlling circuit of the T-CON load variation comprises: a power source chip and a voltage controlling circuit, and the voltage controlling circuit comprises a photoelectric coupler, a first comparator, a second comparator, a first field effect transistor and a second field effect transistor;

wherein a first pin of the photoelectric coupler is coupled to the other terminal of an inductor, one terminal of the inductor is connected to a voltage output terminal of the power source chip, a second pin of the photoelectric coupler is connected to a core voltage, a third pin of the photoelectric coupler is connected to the other terminal of a first resistor, one terminal of the first resistor is connected to a ground, and a fourth pin of the photoelectric coupler is connected to a first voltage source;

wherein a positive power terminal of the first comparator is connected to a second voltage source, a negative power terminal of the first comparator is connected to an equivalent electric potential point, a positive input terminal of the first comparator is connected to the third pin of the photoelectric coupler, a negative input terminal of the first comparator is connected to a first comparing voltage, and an output terminal of the first comparator is connected to a gate of the second field effect transistor; a positive power terminal of the second comparator is connected to the second voltage source, a negative power terminal of the second comparator is connected to the equivalent electric potential point, a negative input terminal of the second comparator is connected to the third pin of the photoelectric coupler, a positive input terminal of the second comparator is connected to a second comparing voltage, and an output terminal of the second comparator is connected to a gate of the first field effect transistor;

wherein a drain of the first field effect transistor is connected to the core voltage through the first pin and second pin of the photoelectric coupler, a source of the first field effect transistor is connected to one terminal of a second resistor, the other terminal of the second resistor is connected to a feedback voltage terminal of the power source chip, a drain of the second field effect transistor is connected to the other terminal of a third resistor, one terminal of the third resistor is connected to the feedback voltage terminal of the power source chip, and a source of the second field effect transistor is connected to the ground.

2. The voltage controlling circuit of the T-CON load variation according to claim 1, wherein the voltage controlling circuit further comprises: a fourth resistor;
wherein one terminal of the fourth resistor is connected to the fourth pin of the photoelectric coupler and the other terminal of the fourth resistor is connected to the first voltage source.

3. The voltage controlling circuit of the T-CON load variation according to claim 1, wherein the voltage controlling circuit further comprises: a capacitor;
wherein one terminal of the capacitor is connected to the other terminal of the inductor, the other terminal of the capacitor is respectively connected to the output terminal of the first comparator and the output terminal of the second comparator.

4. The voltage controlling circuit of the T-CON load variation according to claim 1, wherein the second voltage source is a voltage source with 3.3V or a voltage source with 5.5V.

5. A display panel, wherein the display panel comprises: a voltage controlling circuit of T-CON load variation and the voltage controlling circuit of the T-CON load variation comprises: a power source chip and a voltage controlling circuit, and the voltage controlling circuit comprises a photoelectric coupler, a first comparator, a second comparator, a first field effect transistor and a second field effect transistor;
wherein a first pin of the photoelectric coupler is coupled to the other terminal of an inductor, one terminal of the inductor is connected to a voltage output terminal of the power source chip, a second pin of the photoelectric coupler is connected to a core voltage, a third pin of the photoelectric coupler is connected to the other terminal of a first resistor, one terminal of the first resistor is connected to a ground, and a fourth pin of the photoelectric coupler is connected to a first voltage source;
wherein a positive power terminal of the first comparator is connected to a second voltage source, a negative power terminal of the first comparator is connected to an equivalent electric potential point, a positive input terminal of the first comparator is connected to the third pin of the photoelectric coupler, a negative input terminal of the first comparator is connected to a first comparing voltage, and an output terminal of the first comparator is connected to a gate of the second field effect transistor; a positive power terminal of the second comparator is connected to the second voltage source, a negative power terminal of the second comparator is connected to the equivalent electric potential point, a negative input terminal of the second comparator is connected to the third pin of the photoelectric coupler, a negative input terminal of the second comparator is connected to a second comparing voltage, and an output terminal of the second comparator is connected to a gate of the first field effect transistor;
wherein a drain of the first field effect transistor is connected to the core voltage through the first pin and second pin of the photoelectric coupler, a source of the first field effect transistor is connected to one terminal of a second resistor, the other terminal of the second resistor is connected to a feedback voltage terminal of the power source chip, a drain of the second field effect transistor is connected to the other terminal of a third resistor, one terminal of the third resistor is connected to the feedback voltage terminal of the power source chip, and a source of the second field effect transistor is connected to the ground.

6. The voltage controlling circuit of the T-CON load variation according to claim 5, wherein the voltage controlling circuit further comprises: a fourth resistor;
wherein one terminal of the fourth resistor is connected to the fourth pin of the photoelectric coupler and the other terminal of the fourth resistor is connected to the first voltage source.

7. The voltage controlling circuit of the T-CON load variation according to claim 5, wherein the voltage controlling circuit further comprises: a capacitor;
wherein one terminal of the capacitor is connected to the other terminal of the inductor, the other terminal of the capacitor is respectively connected to the output terminal of the first comparator and the output terminal of the second comparator.

8. The voltage controlling circuit of the T-CON load variation according to claim 5, wherein the second voltage source is a voltage source with 3.3V or a voltage source with 5.5V.

9. A display device, wherein the display device comprises the display panel according to claim 5.

* * * * *